Figure 4:
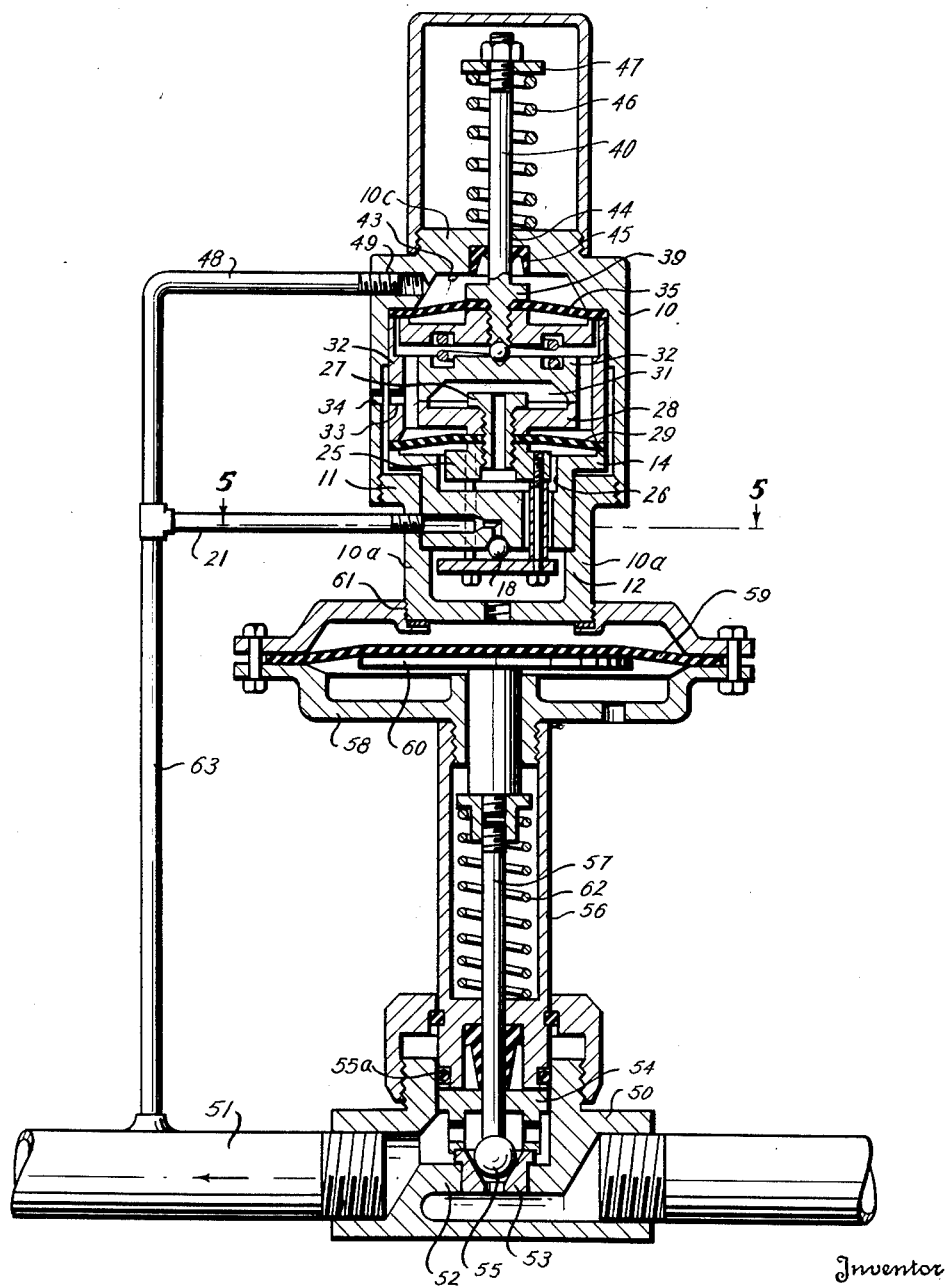

May 12, 1953
A. S. PARKS
2,637,945
FLUID PRESSURE CONTROL DEVICE
Filed March 21, 1949
4 Sheets-Sheet 1
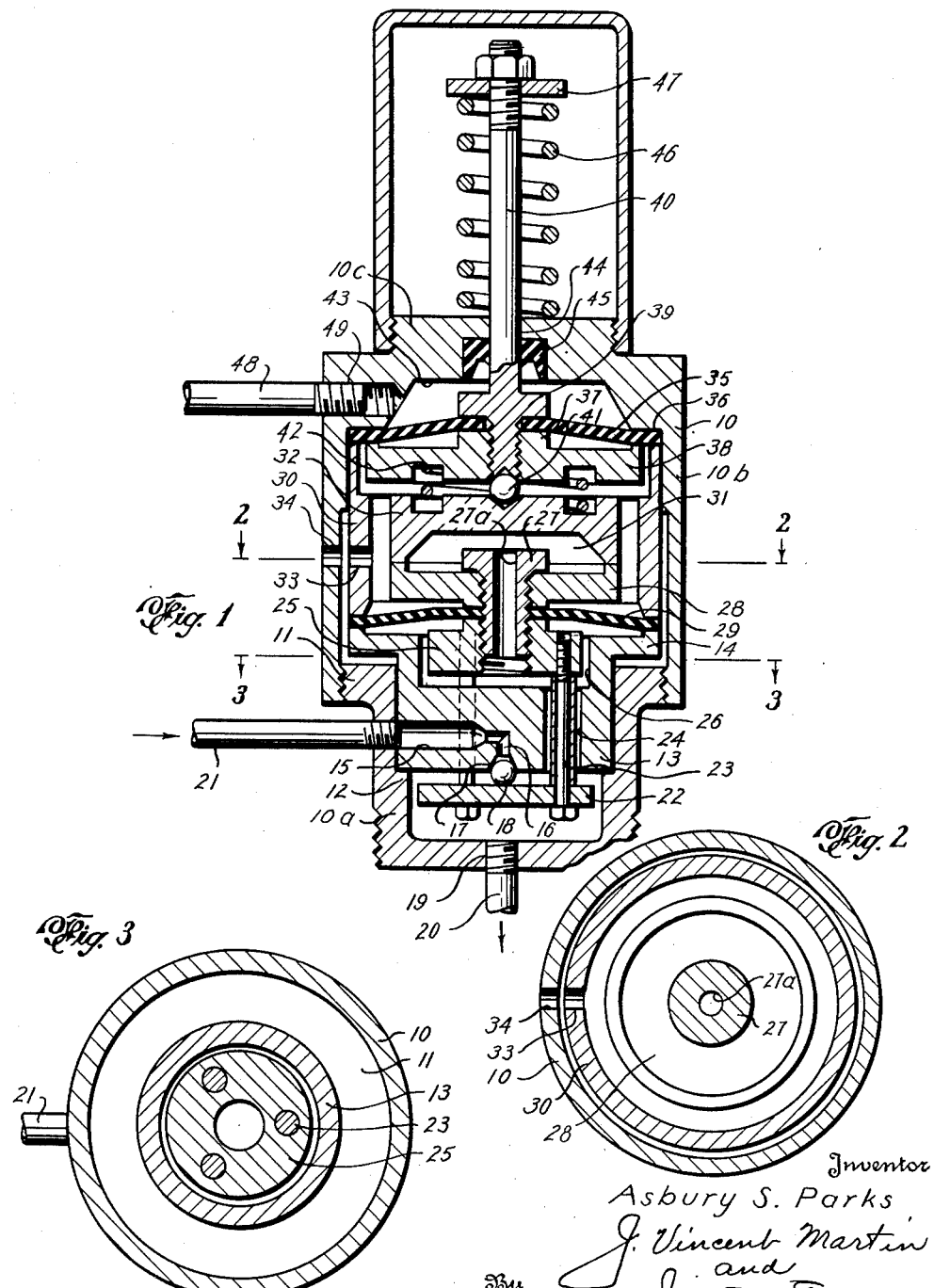
Inventor
Asbury S. Parks
By J. Vincent Martin
and
Joe E. Edwards
ATTORNEYS May 12, 1953 A. S. PARKS 2,637,945
FLUID PRESSURE CONTROL DEVICE
Filed March 21, 1949 4 Sheets-Sheet 2

Inventor
Asbury S. Parks
By J. Vincent Martin
and
Joe E. Edwards
ATTORNEYS

May 12, 1953  A. S. PARKS  2,637,945
FLUID PRESSURE CONTROL DEVICE
Filed March 21, 1949  4 Sheets-Sheet 3

Inventor
Asbury S. Parks
By J. Vincent Martin
and
Joe E. Edwards
ATTORNEYS

May 12, 1953
A. S. PARKS
2,637,945
FLUID PRESSURE CONTROL DEVICE
Filed March 21, 1949
4 Sheets-Sheet 4
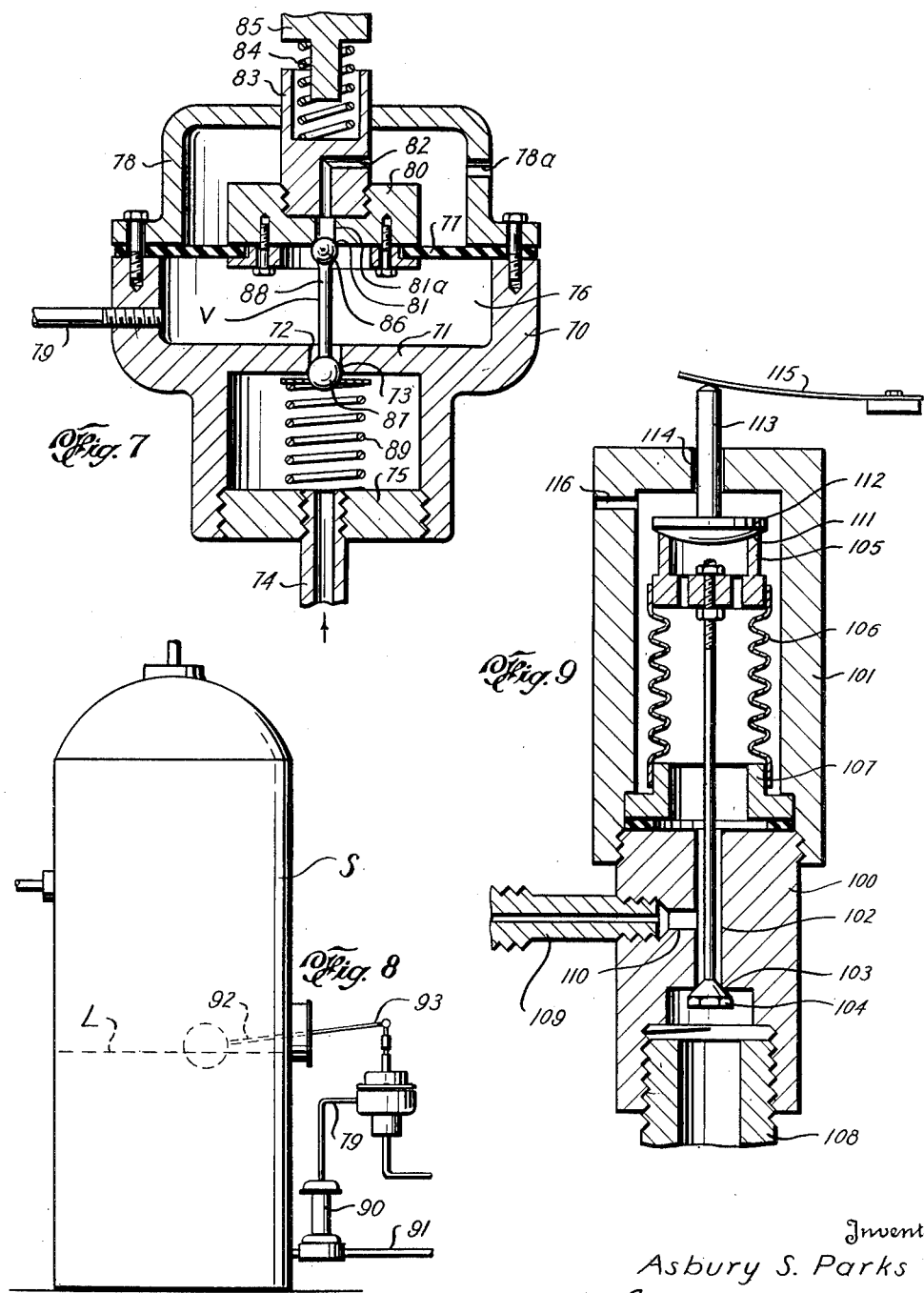
Inventor
Asbury S. Parks
By J. Vincent Martin
and
Joe E. Edwards
ATTORNEYS

Patented May 12, 1953

2,637,945

UNITED STATES PATENT OFFICE 2,637,945

FLUID PRESSURE CONTROL DEVICE

Asbury S. Parks, Houston, Tex.

Application March 21, 1949, Serial No. 82,630

8 Claims. (Cl. 50—10)

This invention relates to new and useful improvements in fluid pressure control devices and particularly to devices for controlling the pilot pressure which actuates a motor valve, regulator or other pressure-operated apparatus.

This application is filed as a continuation-in-part of my co-pending application, Serial No. 17,285, which was filed March 26, 1948 and is now abandoned.

One object of the invention is to provide an improved fluid pressure control device or unit which is extremely sensitive in operation and which is adapted to be actuated by a variable force or pressure to control a fluid pressure, with said fluid pressure being accurately controlled in accordance with and in direct ratio to the variable force or pressure acting on said control unit.

An important object of the invention is to provide an improved control device or unit for controlling a fluid pressure which device is so constructed that as an external variable force is applied to the unit, the fluid pressure is controlled in direct proportion to said applied force, whereby the controlled pressure may be utilized to actuate a motor valve or other pressure-operated apparatus to operate the same in accordance with the variable force acting on said control unit or device.

Another object of the invention is to provide a fluid pressure control unit, of the character described, for operating a pressure-actuated apparatus in accordance with a variable force or pressure, wherein the variable controlling force or pressure is applied to the control unit, with an increase or decrease in applied force resulting in an increase or decrease in a controlled fluid pressure which actuates the pressure-actuated apparatus, the increase or decrease in the controlled pressure immediately functioning to counteract or balance the controlling applied force so that the fluid pressure is progressively increased or decreased by continued increase or decrease in applied force.

A particular object of the invention is to provide an improved control unit for a pilot pressure, wherein the pilot pressure is confined in a closed chamber and is gradually increased to actuate the pressure-operated apparatus as the external controlling force or pressure increases, whereby constant bleeding of the pilot pressure is not required and conservation of the pilot fluid is effected.

Still another object of the invention is to provide an improved pilot pressure control unit wherein a force or pressure responsive element is subjected on one side to an external applied force and on its opposite side to the pilot pressure fluid being controlled, whereby any increase in applied force results in an increase in the pressure of the controlled fluid, which increase in fluid pressure immediately opposes the applied force to again balance the pressure-responsive element; this arrangement functioning to progressively increase the pilot pressure in direct proportion to the applied force and with substantially zero motion of the working parts of the unit, whereby extremely sensitive control may be had; the unit also including an escape valve associated with the pressure responsive element for allowing a reduction of the controlled pilot pressure in the event said pressure exceeds the external applied force.

Another object of the invention is to provide an improved control unit, of the character described, which may be employed for controlling operation of a main valve in a pressure line, wherein a normally closed pressure chamber is associated with one side of the main valve actuator, whereby an increase or decrease of the pressure in said chamber varies the force acting upon said actuator to thereby vary the position of the main valve; the pressure within said pressure chamber being controlled in accordance with any variations occurring in the pressure of the fluid within the pressure line or conductor in which the main valve is mounted, whereby said main valve is automatically adjusted in response to said variations to maintain or regulate the pressure in said line.

A further object of the invention is to provide an improved pilot control mechanism for a regulator which regulates the pressure in a line or conductor, said mechanism including an improved assembly or unit for controlling the operation of a main control valve actuator to control the position of said valve; said assembly comprising a pressure chamber having a pilot valve control element exposed therein with the pressure within the chamber normally holding the control element in a position closing the pilot, together with means for applying a force to unbalance the condition within the pressure chamber and open the pilot, said means being operated solely by the variation in pressure which occurs in the pressure line; the pilot element also being operable when the pressure in the flow line falls below a predetermined point for reducing the pressure within the chamber to effect operation of the main valve in a direction which will regulate the pressure in the line to the desired degree.

A still further object of the invention is to provide an improved pilot pressure control device or unit which may be combined with a pressure regulator or which may be utilized to control a motor valve or other pressure-actuated apparatus for controlling liquid level, temperature or the like, with the external applied force being in accordance with the variations in pressures, liquid level, or temperatures being controlled, whereby the pressure regulator or other pressure-actuated apparatus is operated in direct accordance with the variations in the particular variable being controlled.

The construction designed to carry out the invention will be hereinafter described together with other features of the invention.

Figure 6:
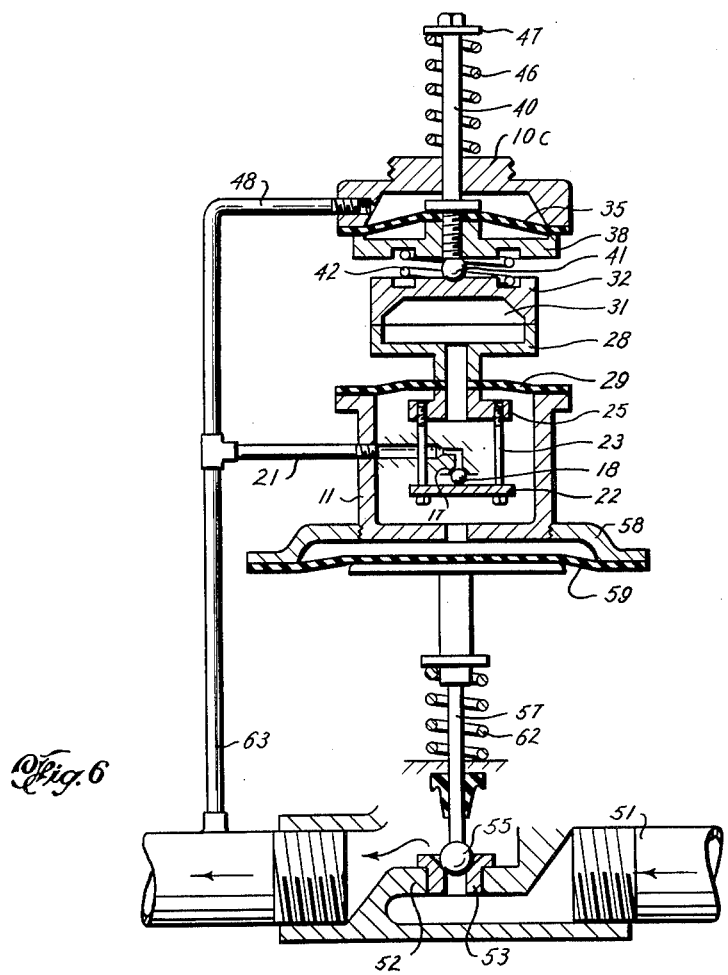
Figure 5:
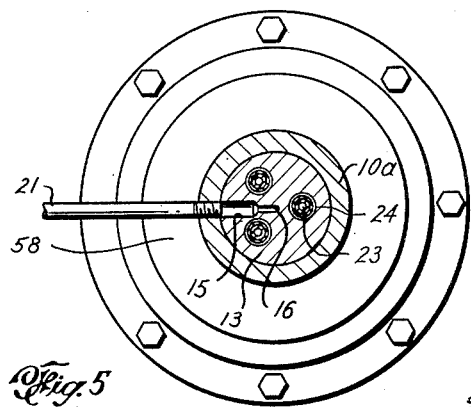

The invention will be more readily understood from a reading of the following specification and by reference to the accompanying drawings, wherein an example of the invention is shown, and wherein:

Figure 1 is a transverse, vertical sectional view of an improved pressure control device, constructed in accordance with the invention, Figure 2 is a horizontal, cross-sectional view, taken on the line 2—2 of Figure 1, Figure 3 is a horizontal, cross-sectional view, taken on the line 3—3 of Figure 1, Figure 4 is a transverse, vertical, sectional view, illustrating the control device combined with a pressure regulator, Figure 5 is a horizontal, cross-sectional view, taken on the line 5—5 of Figure 4, Figure 6 is a schematic view, showing the combined control device and regulator, Figure 7 is a transverse, vertical, sectional view of a modified form of the control device, Figure 8 is an elevation, showing the form of device shown in Figure 7 mounted on an oil and gas separator, for controlling the liquid level therein, and Figure 9 is a transverse, vertical, sectional view of still another modified form of the invention.

In the drawings, the numeral 10 designates a housing which includes an annular base member 10a and an upper casing 10b, which are connected together by threads 11. An internal annular shoulder 12 is formed within the base 11 and a pilot valve block 13 is supported upon said shoulder. The upper end of the block extends upwardly beyond the base member 10a and within the lower portion of the casing 10b and this upper end is provided with an integral annular flange 14. A pressure fluid inlet 15 extends radially through the block to substantially the central portion thereof, and has its inner end communicating with an angular port 16, the lower end of which terminates in an annular valve seat 17. A ball valve 18 is adapted to engage the seat 17 and when in a seated position closes the pressure fluid inlet; obviously, when the ball is unseated, pressure fluid may enter the annular base member 10a of the housing and, as will be explained, may be conducted therefrom through an outlet opening 19 within which an outlet pipe may be connected. A pressure inlet pipe 21 is threaded through the wall of the base member 10a and communicates with the radial passage 15.

The pilot valve 18 is normally retained on its seat 17 by a supporting or retaining plate 22 which underlies the block 13 within the base member 10a. Vertically extending bolts 23 extend through the plate 22 with the heads of said bolts below the plate and said bolts extend upwardly through openings 24 formed in the valve block 13. The extreme upper end of each bolt is fastened within a circular support 25 which is movable within a countersunk recess 26 formed in the upper end of the block 13. The circular support 25 is connected by means of a flanged bolt 27 with the base plate 28 of a relief or escape valve, and the central portion of a lower diaphragm 29 is clamped between the base plate and the support. The outer peripheral portion of the diaphragm rests upon the upper end of the flange 14 of the valve block 13 and is maintained in engagement therewith by an annular sleeve 30.

It is apparent that the circular support 25 is thus connected with the lower diaphragm 29 and any downward movement of the support 25 will impart a downward movement to the supporting plate 22 which normally maintains the pilot valve 18 on its seat. The openings 24 through which the connecting bolts 23 extend are considerably larger in diameter than said bolts, and the spacer sleeve surrounding the latter, whereby pressure which may be present within the base member 10a may pass upwardly and act against the under side of the lower diaphragm 29. The connecting bolt 27 which fastens the base plate 28 to the support 25 is provided with an axial bore 27a, whereby the pressure within the base 10a and beneath the lower diaphragm 29 may flow upwardly into the space above the base plate 28. This space comprises a chamber 31 which is formed by the base plate 28 and by a closure member 32 which, as is clearly shown in Figure 1, engages the peripheral portion of the base plate. The closure member 32 and the base plate 28 form a relief or escape valve and when these parts are in engaged position, there can be no escape of pressure from the chamber 31; however, a separation of the closure member 32 and the base plate allows pressure from within the chamber 31 to escape into the interior of the sleeve 30 above the lower diaphragm 29. This sleeve is formed with a vent opening 33 and the outer casing 10b is formed with a similar vent port 34 whereby the pressure escaping from chamber 31 may be vented to atmosphere. As has been noted, the chamber 31 is in communication through the bore 27a of the fastening bolt with the area beneath the lower diaphragm and within the base member 10a, and thus, when the escape or relief valve formed by the member 32 and base plate 28 is open, the pressure within the annular base member 10a below the diaphragm may be reduced.

For urging the closure member 32 into sealing engagement with the base plate 28, an upper diaphragm 35 is provided. This diaphragm has its marginal edge portion clamped between the upper edge of the sleeve 30 and an annular shoulder 36 formed within the housing 10. The central portion of the upper diaphragm 35 rests upon an upstanding axial collar 37 which is formed at the central portion of a follower disc 38 and is clamped in position by an annular flange or enlargement 39 which is formed on an upstanding stem 40. Below the enlargement, the stem is formed with external threads so that it may be threaded into the collar 37 and disc 38. The extreme lower end of the stem is notched, as is the upper surface of the closure member 32, whereby a ball bearing 41 may be interposed between these parts. It will be apparent that a downward pressure on the upper diaphragm 35 will transmit a force to the closure member 32 to maintain this closure in tight sealing engagement with its base plate 28.

If the force above the diaphragm 35 increases sufficiently, this force is transmitted through the closure 32 and base plate 28 to the support 25 and from this support through the bolts 23 to the valve supporting plate 22, whereby said plate is lowered. This allows the valve 18 to move from its seat 17 whereby pressure from the line 21 may be admitted into the base member 10a of the housing, as well as into the area below the lower diaphragm 28 and into the chamber 31 between the closure 32 and its base plate 28. Of course, if the force above the diaphragm 35 is insufficient to permit unseating of the pilot valve 18, said valve remains closed; in the event the downward force on the closure plate 32 is reduced below the pressure within the chamber 31, the pressure within said chamber will raise the closure 32 from its base plate 28 and thereby allow a venting of the pressure from within the chamber 31 through the vent ports 33 and 34.

To maintain the escape or relief valve formed by the closure member 32 and its base plate 28 closed under certain conditions, a light coil spring 42 is interposed between the upper end of the closure member 32 and the follower disc 38, and the pressure of this spring is such that under normal operating conditions, it does not interfere or affect the operation; however, in case the force acting downwardly on the upper surface of the closure member drops below a predetermined point, the spring will function to hold the closure member in engagement with the base plate and the force of this spring will have to be overcome by the internal pressure within the chamber 31 before the relief or escape valve will open.

Above the annular shoulder 36 against which the marginal portion of the upper diaphragm is clamped, the housing 10 is formed with a cavity 43 which is located above the diaphragm. The upper end of the cavity is closed by the top 10c of the housing, which top has an axial bore 44 through which the stem 40 connected with the diaphragm 35 extends. Suitable packing ring 45 packs off around this stem. A spring 46 surrounds the stem and is confined between the top 10c of the housing and a washer 47 on the extreme upper end of the stem and constantly exerts its pressure to urge the stem 40 and the diaphragm 35 upwardly. This spring is opposed or acts in a direction opposite to the pressure within the cavity 43, said pressure being conducted into the cavity through a pressure inlet pipe 48 which is connected within an inlet port 49 in the housing.

In the operation of the device, it will be presumed that the pressure in the line 48 is variable, this pressure acting upon the upper diaphragm 35 to exert a variable force upon the unit. It is desired to control the pilot pressure in the line 20 which may be conducted to a motor valve or any suitable pressure operated device, whereby said device will be actuated upon the application of a predetermined force. The spring 46 is of a predetermined tension in accordance with the particular pressure which is employed for actuating the mechanism and is adjusted so as to counterbalance the major portion of this pressure. For example, if the fluid pressure in the line 48 and cavity 43 is one hundred pounds per square inch, the spring 46 may have a force counter-balancing a pressure of ninety pounds per square inch acting on the diaphragm 35. The area of the diaphragm 35 may be substantially the same as the area of the lower diaphragm 29, but is greater than the area of the closure member 32. Since the areas of the diaphragms 29 and 35 are equal, ten pounds per square inch acting to urge the diaphragm 29 upwardly will equal or balance the effective downward force acting on the diaphragm. Thus, the tension or loading of the spring 46 determines the differential between the pressures acting on the diaphragms 29 and 35 which is required to maintain a balance. As is clearly shown in Figure 6, the space below the diaphragm 29 actually forms a chamber which is in communication with the chamber 31 formed between the closure 32 and its base plate 28.

Assuming that the pressure conditions are balanced with the pilot valve 18 in its seated position, an increase in pressure in the line 48 will result in an increase in the force downwardly on the unit. This downward force acting through the follower disc 38, closure member 32, and base plate 28, and then through the support 25 connecting bolts 23, lowers the supporting plate 22 to permit unseating of the valve 18. Immediately that the valve 18 leaves its seat, pressure from the line 21 is admitted into the lower portion of the housing and into the area below the diaphragm 29 to increase the pressure below said diaphragm. This pressure increase is acting in opposition to the downward force and will substantially almost immediately balance the applied force. As soon as the forces are again balanced, the supporting plate 22 moves upwardly to its original position to reseat the pilot valve but a pressure increase has occurred in the lower portion of the housing and in the pilot outlet line 20. This increase has been effected with a minimum movement or substantially zero motion of the parts because it is apparent that as soon as the valve 18 opens, pressure below diaphragm 29 increases to almost immediately balance the applied force and re-seat the valve.

A continued increase of pressure in the line 48 and in the cavity 43 above the upper diaphragm will again increase the applied force on the unit with the result that the pilot valve 18 will again open; however, as soon as said valve opens to increase the pressure within the pilot valve chamber to a point balancing the applied force, the pilot valve again closes and thus the pressure in chamber 31 and line 20 is again increased. This operation progressively continues, assuming that there is a continuous increase in the line 48, to progressively increase the pilot pressure in the line 20. It is obvious that the increasing pressure in line 20 may be employed to operate any type of pressure-actuated mechanism and if the device is a regulator, the progressively increasing pilot pressure would progressively actuate the regulator to provide a throttling action; if the pressure-actuated mechanism is so arranged, the gradually increasing pilot pressure may be utilized, upon reaching a predetermined point, to operate the mechanism with a snap action. Upon operation of the pressure-actuated mechanism, the pressure in the line 48 is reduced by such operation as will appear hereinafter, to reduce the force being applied through the upper diaphragm 35 and as the applied force is reduced, the pilot valve 18 is maintained in a seated position. This condition remains until the force applied to the unit increases sufficiently to again allow increase in the pilot pressure to the operating level.

In the event the pressure within the lower portion of the housing and within the chamber 31 exceeds the applied force, the pressure within the chamber 31 will separate the closure member 32 from its base plate and allow a venting or escape of pressure from the chamber 31 until such time as the unit is again balanced. The spring 42 which is interposed between the closure member 32 and the follower disc 38 is inactive under normal operating conditions and only functions in the event that the pressure in the line 48 falls below the pressure for which the pilot is set. If such a condition should occur, the force on the diaphragm which is tending to maintain the closure member 32 seated on the base plate is completely removed and the pressure within chamber 31 would separate the closure from its base plate and allow a by-passing or continuous escape of pilot pressure fluid, which by-passing would continue until the pressure in line 48 again built up sufficiently to apply the necessary downward force to the closure member. The tension or force of the spring 42 is so adjusted that the greatest pressure which it will hold within the chamber 31 is not sufficient to actuate the particular pressure responsive device to which the line 20 is connected; at the same time, this pressure held in the chamber 31 by the spring 42 is sufficient to maintain the plate 22 raised and the pilot ball valve seated. Thus, in the event of a pressure failure in the line 48, a continuous by-passing or escape of the pilot pressure cannot occur.

The diaphragms 29 and 35 have been illustrated as of the same area, but it is pointed out that said diaphragms may be of different areas. As illustrated, with the diaphragms having equal areas, a one pound variation in the pressure in line 48 results in a one pound variation in the pilot pressure chamber; if the diaphragm 35 was double or twice the area of the diaphragm 29, a one pound change in the line pressure would result in a two pound change in the chamber pressure. Therefore, it is obvious that it is within the scope of this invention to vary the diaphragm areas relative to each other in any desired manner to obtain the required sensitivity. Similarly, the area of the closure member 32 of the escape or relief valve unit is subject to variation, provided, however, that its area always be less than the area of the lower diaphragm 29.

The particular device as above described is useful for controlling a pressure fluid such as a pilot pressure fluid employed for actuating various devices. One method of employing the invention for pressure regulation is illustrated in Figures 4-6, wherein the device is combined with a pressure regulator valve. As shown in Figure 4, a main control valve 50 is mounted in a flow line or conductor 51 through which the fluid to be regulated flows. The valve is of usual construction and includes a transverse partition 52 having a valve seat 53 mounted within an opening therein. The valve seat is retained in position by a retaining element 54 which is insertable through an opening 55a in the valve body. A cylindrical sleeve member 56 engages and maintains the retaining member 54 in position and a valve 55 is adapted to engage the seat 53. The valve has a stem 57 extending upwardly through the sleeve 56 and the upper end of the stem extends into a diaphragm case 58. An actuating diaphragm 59 mounted within the case has the usual disc 60 therebelow and this disc engages the upper end of the valve stem 57. The lower end of the base member 10a of the control device is threaded into an opening 61 in the top of the diaphragm case 58 and in this event, the conductor or pipe 20 is removed from the outlet port 19 in the lower end of the base member whereby pressure from within the control device may act upon the upper end of the operating diaphragm 59 of the valve.

It will be apparent that when the pressure above the operating diaphragm 59 of the valve is sufficient the valve 55 is seated against tension of a spring 62 which surrounds the valve stem 57. Reduction of pressure above the diaphragm 59 allows the spring 62 to lift said valve and allow flow through the line. To control this flow and thereby regulate the pressure in the downstream side of the conductor 51, a pipe 63 leading from the downstream side of said conductor connects with the pipes 48 and 21 of the control unit. In this way, the downstream pressure is utilized to apply the force to the upper diaphragm 35 of the control device. As this downstream pressure varies, the applied force varies in direct proportion thereto and this results in a variation in the pilot pressure which is acting on the upper end of the main operating diaphragm 59 of the valve 55. Thus, the position of the valve is controlled in accordance with the variations in downstream pressure to accurately regulate the pressure in the line 51. If desired, a suitable pressure regulator (not shown) may be mounted in line 21 to provide a pilot fluid supply of a substantially steady pressure but of course, it is obvious that the pilot pressure being supplied through the line 21 must always be greater than the maximum pressure, which will be desired or required in the pilot outlet line 20 in Figure 1 or in the area above diaphragm 59 in Figure 4.

In the operation of the device when combined with a pressure regulator to control the line pressure on the downstream side, the downstream pressure is conducted through the pipe 63 and line 48 to the cavity 43 above the upper diaphragm 35. When the pressure in the downstream side of the flow line falls below the pressure to be maintained, the force acting on the control assembly unit is lessened. When this occurs, the pressure within the chamber 31 acting against the closure member 32 of the escape valve lifts said closure and allows a venting of some of the pressure within the control assembly unit and from the space above the main operating diaphragm 59 of the line valve 55. The escape valve formed by the closure member 32 and its base plate will be actuated proportionately or directly in accordance with the reduction in the pressure above the diaphragm 35, whereby the amount of pressure reduction in the chamber 31 is proportional to the force variation. Therefore, the pressure in the chamber 31 is reduced only to the point which will again balance the forces acting on the two diaphragms 35 and 29, at which time the escape valve will again close.

Reduction in the downstream pressure, therefore, results in a reduction of the pressure acting on the main operating diaphragm and permits the main valve 55 to be opened to allow flow. This flow causes an immediate increase in the downstream pressure and this increase acting on the upper diaphragm 35 immediately applies an increased force to the closure member 32 to again seal its joint with the base plate 28. Any continued increase in the downstream pressure in line 51 continues to increase the applied force on the control device with the result that the pilot valve 18 is unseated. As explained, unseating of the pilot valve 18 will admit the pilot pressure into the lower portion of the housing 10 and into the area above the main operating diaphragm 59. Such increase of pressure will cause a downward movement of the main operating diaphragm to move the valve 55 toward its closed position and reduce flow to the downstream side of the flow line. If the increase is beyond the point which is to be maintained, the force applied through the diaphragm 35 and transmitted to the pilot valve supporting plate is sufficient to hold the pilot open and this condition would result in a continued movement of the main valve 55 toward its closed position and may even reach the point of actually closing the valve. However, in actual practice, the pilot valve is only momentarily opened to increase the pressure in the chamber above the main operating diaphragm 59 with such increase immediately resulting in adjustment of the main valve 55.

As shown in Figures 4-6, the control assembly is described as maintaining the downstream pressure in a flow line and is applied to a pressure closing and spring opening valve. However, it is apparent that the pilot pressure which is accurately and sensitively controlled in accordance with variations in the applied force may be combined with any type of motor valve, such as a pressure opening or spring closing valve, and may be utilized to control pressures either upstream or downstream of the main valve. The invention herein resides primarily in the control assembly or unit shown in Figure 1, and it may have many varied applications.

In Figures 7 and 8, a modified form of the control device is illustrated wherein the device is employed for controlling the liquid level within an oil and gas separator. In this modification, the device includes a base 70 having a transverse partition 71 thereacross. An axial opening 72 surrounded by a valve seat 73 is formed in the partition and a pressure inlet supply line 74 is connected in a closure plate 75, which closes the lower end of the base. Pressure from the supply line 74 which is always of a pressure higher than the maximum controlled pressure which will be desired, may thus enter the base member 70 and flow past the valve seat into a chamber 76 provided in the upper portion of the base. The upper end of the chamber is defined by a flexible diaphragm 77 which has its marginal edge portion clamped between the base and a cover member 78. Obviously, any pressure in the chamber 76 may act against the under side of the diaphragm. A pilot pressure line 79 extends outwardly from one side of the chamber to the pressure-actuated mechanism which is to be operated.

The central portion of the diaphragm is connected to the under side of a block 80 and the block is formed with an axial opening 81a surrounded by an annular valve seat 81 and communicates with an angular passage 82 formed in a stem 83. The stem is threaded into the upper end of the block and extends upwardly through the closure and is shown as connected through a coil spring 84 with the lower end of a force applying rod 85. Any movement of the force applying rod 85 will act upon the spring 84 and the spring, in turn, will transmit the force to the stem 83; thus, the rod 85 may undergo considerable movement without causing the same amount of movement of the stem. With such arrangement the rod 85 may undergo a greater movement than the stem because the spring 84 functions to translate rod movement into force applied to the stem. A double valve V having a ball valve 86 at its upper end and a ball valve 87 at its lower end with said balls connected by a stem 88 is positioned to engage the valve seats 81 and 73. A light coil spring 89 normally urges the valve V upwardly to seat both valves.

In the operation of this form with the parts in the position shown in Figure 7, the supply pilot pressure is within the lower end of the base below the partition 71. As a force is applied to the rod 85, this force is transmitted downwardly through the stem 83 and the block 80 to the valve V and upon overcoming the pressure acting on the under side of the diaphragm 77, the lower ball valve 87 is unseated. This admits pressure into the chamber 76 to immediately increase the pressure acting beneath the diaphragm 77 to balance the applied force and return the valve 87 to its seated position. The continued increase of force through the rod 85 and stem 83 results in a progressive increase in pressure within the chamber 76, which pressure is conducted through the line 79 to a suitable pressure responsive mechanism to operate the same. In the event the pressure within the chamber exceeds the applied force, this pressure acting beneath the diaphragm 77 raises said diaphragm and block 80 attached thereto so that the said seat 81 is disengaged from the upper valve 86, thereby allowing a venting of pressure from the chamber 76 through the annular opening 82 and into the cover member 78. From the cover member, pressure may be vented to atmosphere through a vent port 78a.

The form shown in Figure 7 operates on the same principle as the form shown in Figure 1, except that a simplified type of relief or escape valve is provided and also only a single diaphragm is employed with the force being transmitted through the rod and stem 83 rather than through an upper diaphragm as in the first form.

The form illustrated in Figure 7 is shown applied to an oil and gas separator S in Figure 8. The line 79 is connected to a motor valve 90 which controls the escape of liquid from the separator through an outlet line 91. A pivoted float 92 has the outer end of its arm 93 connected to the operating rod 85. In this case, when the level L of the liquid within the separator rises to a predetermined point, a predetermined force will be applied to the block 80 and valve element V whereby the lower ball valve 87 is opened to increase the pilot pressure within the chamber 76 to a predetermined point, whereby the motor valve 90 is opened to permit the escape of liquid from the separator. As the liquid level falls, the force which is applied through the rod 85 is reduced, thereby allowing the valve V to close, which in turn permits the motor valve 90 to close the conductor 91. Of course, it is evident that the valve 90 may be operated with a throttling action, finding a partially open position in accordance with the force applied and in accordance with the liquid level being controlled to drain the liquid from the separator in a manner to maintain the desired liquid level.

Still another form of the invention is illustrated in Figure 9, and this form is particularly adaptable for use in controlling temperature. In this modification, the device comprises a tubular base 100 having a housing 101 secured to its upper end. The base is provided with an axial bore 102 having a valve seat 103 at its lower end. The seat is adapted to be engaged by a valve 104 and the stem of said valve extends upwardly through the bore and is connected to the bottom of an annular valve seat member 105. A bellows 106 has its upper end connected to the member 105 while its lower end is fastened to a flanged ring 107 which is confined between the base and the housing.

A supply of pressure fluid is conducted to the base through a supply line 108 and the controlled pilot pressure is conducted therefrom through a line 109 which connects to a radial port 110, which is in communication with the bore 102. The valve seat member 105 has an annular valve seat 111 which is adapted to be engaged by a valve disc 112. A stem 113 extends upwardly from the valve disc through an opening 114 in the housing and a bimetallic thermal element 115 engages the upper end of the stem.

In the operation of this form with the parts in the position shown in Figure 9, the action of temperature on the thermal element 115 will apply a downward force to the valve disc and through said disc to the valve stem and valve 104. When this applied force is sufficient, the valve 104 is unseated and the pressure within the chamber formed by the bellows 106 is proportionately increased. When sufficient force is applied by the element 115 in accordance with the predetermined temperature conditions, a predetermined pressure within the bellows acts through the line 109 to actuate a suitable temperature changing mechanism. At any time that the pressure within the chamber formed by the bellows 106 exceeds the pressure of the applied force, the valve disc 112 is unseated and an escape of pressure may occur through a radial vent port 116 provided in the housing. As in the other forms of the invention, a variable applied force is utilized to control the pilot pressure. In each instance, as the pilot valve is opened to admit pressure, the pressure within the closed chamber immediately counteracts the applied force to return the parts to a balanced condition. At any time that the pilot pressure being controlled exceeds the pressure of the applied force, provision is made to vent such pressure. It is apparent that the particular control unit has many applications, in the various fields of pressure, temperature and liquid level control.

The foregoing description of the invention is explanatory thereof and various changes in the size, shape and materials, as well as in the details of the illustrated construction may be made, within the scope of the appended claims, without departing from the spirit of the invention.

Having described the invention, I claim:

1. A pressure control device for controlling the pressure of a fluid within a pressure line including, a closed pressure chamber having a pressure fluid inlet and having a pressure line extending therefrom, a valve for controlling flow through the inlet into said chamber, pressure-responsive means exposed to the pressure within the chamber and co-acting with the inlet valve to permit opening and closing thereof, means for applying a variable force to the pressure-responsive means in opposition to the closed chamber pressure acting on said means whereby the inlet valve is opened and closed in accordance with variations in the applied force, and a vent valve means interposed between the force-applying means and the pressure responsive means and operable independently of the pressure-responsive means and actuated by the differential between the applied force and the pressure within the chamber for venting the chamber when said chamber pressure exceeds the applied force, whereby the increase or decrease of pressure within the chamber is directly proportional to the variation in applied force.

2. A control apparatus as set forth in claim 1, wherein the vent valve means for venting the chamber is an escape valve having one side acted upon by the applied force and its opposite side exposed to the pressure within the closed chamber and adapted to be opened when the pressure within the closed chamber exceeds the force which is applied to the pressure responsive means to vent the chamber and reduce the pressure therein to a point which balances said applied force at which said escape valve is again closed.

3. A control device for controlling the pressure of a pilot pressure in accordance with a variable force including, a closed pressure chamber having a pressure fluid inlet and communicating with a pilot pressure line, an inlet valve adapted to seat on the inlet to close the same, a movable pressure-responsive element within the chamber and having one side exposed to the pressure within said chamber, means for retaining the inlet valve in a seated position, a connection between the retaining means and the pressure-responsive element whereby movement of the element will result in opening and closing of the inlet valve, a force transmitting means associated with the pressure-responsive element, and arranged so that an external force may be applied to said element in opposition to the pressure within the chamber acting against one side of said element, means for applying an external variable force to the force transmitting means to apply said force through the means to the pressure-responsive element whereby when said applied force exceeds the chamber pressure acting against the element the inlet valve is opened to admit fluid pressure to the chamber to increase said chamber pressure, increase of said chamber pressure to a point which balances the applied force resulting in a closure of said inlet valve, said force transmitting means being constructed of a pair of separable members with the interior of said members having communication with the closed chamber, said separable members being held in engagement with each other to prevent escape of pressure from the interior thereof when the force applied to the force transmitting means exceeds the chamber pressure, said members being separated to permit escape of pressure therefrom to reduce the chamber pressure when the pressure within the chamber exceeds the external applied force.

4. A control device as set forth in claim 3, wherein the pressure responsive element is a diaphragm.

5. A control device for controlling the pressure of a pilot pressure in accordance with a variable force including, a closed pressure chamber having a pressure fluid inlet and communicating with a pilot pressure line, an inlet valve adapted to seat on the inlet to close the same, a movable pressure-responsive bellows within the chamber and having one side exposed to the pressure within said chamber, means for connecting the bellows to the inlet valve, whereby movement of the bellows will result in opening and closing of the inlet valve, a force transmitting means associated with the pressure-responsive bellows and arranged so that an external force may be applied to said element in opposition to the pressure within the chamber acting against one side of said element, means for applying an external variable force to the force transmitting means to apply said force through the means to the pressure-responsive bellows whereby when said applied force exceeds the chamber pressure acting against the bellows the inlet valve is opened to admit fluid pressure to the chamber to increase said chamber pressure, increase of said chamber pressure to a point which balances the applied force resulting in a closure of said inlet valve, said force transmitting means being constructed of a pair of separable members which are exposed to and urged apart by the pressure within the chamber, said separable members being held in engagement with each other to prevent escape of pressure from the chamber when the force applied to the force transmitting means exceeds the chamber pressure, said members being separated to permit escape of pressure therefrom to reduce the chamber pressure when the pressure within the chamber exceeds the external applied force.

6. A pressure controller including, a closed pressure chamber having a pressure line extending therefrom whereby the pressure within said chamber may act upon said motor to actuate the regulating valve, a pressure inlet in the pressure chamber, a pilot valve adapted to seat on the inlet to close the same, a movable pilot control element engaging the pilot valve and maintained in engagement therewith by the pressure within said pressure chamber, whereby said pressure holds the valve in a seated position, an escape valve unit comprising a split housing having its lower section connected to the pilot control element with its upper section movable relative to the lower section, said housing communicating with the pressure chamber, and means for applying a force to said housing to normally maintain the sections in engagement with each other, reduction of the applied force below a predetermined point resulting in a separation of the sections of the escape valve unit to allow escape of pressure from the pressure chamber to reduce the pressure therein.

7. A pressure controller as set forth in claim 6, together with means associated with the split housing of the escape valve unit for maintaining said escape valve closed in the event that the applied force is reduced below a predetermined point.

8. A control device for controlling the pressure of a fluid within a pressure line including, a closed pressure chamber having a fluid pressure inlet and a pressure line extending therefrom, one wall of said pressure chamber being defined by a movable pressure-responsive element whereby one side of said element is exposed to the pressure within the chamber, an inlet valve for controlling flow through the pressure fluid inlet into the chamber, means co-acting with the pressure-responsive element and with the valve whereby movement of the element to various positions controls the opening and closing of the valve, means for applying a variable force to the pressure-responsive element in opposition to the chamber pressure acting against said element, whereby when the applied force is balanced by said chamber pressure the inlet valve is closed and when said applied force exceeds the chamber pressure, said valve is opened and remains open until the increased chamber pressure again balances the applied force, and an escape valve having one side acted upon by the applied force and its opposite side acted upon by the pressure within the closed chamber and operable independently of the pressure-responsive element, said escape valve being opened when the pressure within the closed chamber exceeds the applied force to vent the chamber and reduce the pressure to the point which balances said applied force.

ASBURY S. PARKS.

References Cited in the file of this patent
UNITED STATES PATENTS

| Number | Name | Date |
|---|---|---|
| 1,354,311 | Landrum | Sept. 28, 1920 |
| 1,637,085 | Nichols | July 26, 1927 |
| 2,013,222 | Thomas | Sept. 3, 1935 |
| 2,196,279 | Thomas | Apr. 9, 1940 |
| 2,229,418 | Mason | Jan. 21, 1941 |
| 2,293,867 | Temple | May 25, 1942 |
| 2,343,146 | Jenkins | Feb. 29, 1944 |
| 2,357,318 | Donaldson | Sept. 5, 1944 |